US012291993B1

(12) United States Patent
Springer

(10) Patent No.: US 12,291,993 B1
(45) Date of Patent: May 6, 2025

(54) TWO STROKE CHARGE PISTON ENGINE

(71) Applicant: Joseph Springer, Montclair, CA (US)

(72) Inventor: Joseph Springer, Montclair, CA (US)

( * ) Notice: Subject to any disclaimer, the term of this patent is extended or adjusted under 35 U.S.C. 154(b) by 0 days.

(21) Appl. No.: 18/968,555

(22) Filed: Dec. 4, 2024

(51) Int. Cl.
*F02B 75/02* (2006.01)
*F02B 25/26* (2006.01)
*F02B 33/04* (2006.01)

(52) U.S. Cl.
CPC .............. *F02B 75/02* (2013.01); *F02B 25/26* (2013.01); *F02B 33/04* (2013.01); *F02B 2075/025* (2013.01)

(58) Field of Classification Search
CPC .......... F02B 75/02; F02B 25/26; F02B 33/04; F02B 2075/025; F02B 59/00
See application file for complete search history.

(56) References Cited

U.S. PATENT DOCUMENTS 1,168,425 A * 1/1916 Rosenhagen ........... F02B 25/00 123/65 V
5,275,134 A * 1/1994 Springer ................. F02B 59/00 123/42
2006/0180105 A1* 8/2006 Springer ................. F02B 33/22 123/70 V
2010/0313832 A1* 12/2010 Rutherford ............. F02B 33/22 123/66
2012/0192841 A1* 8/2012 Meldolesi ................. F01L 1/08 123/70 R

* cited by examiner

*Primary Examiner* — Syed O Hasan
(74) *Attorney, Agent, or Firm* — AGK Patent & Trademark Law; Philip Y Kim

(57) ABSTRACT

An engine includes a cylinder block with a fixed trunnion and a cylinder head pivotably attached to the trunnion. The engine has a charge piston and power piston operating in cylinders attached to the cylinder head. Cylinder head valving controls an airflow from the trunnion interior into a charge piston volume during a charge piston intake stroke and restricts an opposite airflow during a charge piston compression stroke. Chamber valving allows an airflow into a chamber within the charge piston during a compression stroke and captures the air in the chamber during an intake stroke. At Bottom Dead Center (BDC), passages in the charge piston, power piston, and their cylinders form a flow path between the chamber and power piston volume. A throttle body controls air intake into the trunnion, and an ignition device in the cylinder head ignites fuel and air in the power piston cylinder.

11 Claims, 9 Drawing Sheets closed at BDC closed at 90 deg
compression closed at TDC open at 270 deg
intake

TWO STROKE CHARGE PISTON ENGINE

BACKGROUND OF THE INVENTION

The present invention relates to engines and in particular to two stroke engines. Known two stroke engines provide an advantage of firing on every two strokes, versus every four strokes of a four stroke engine. Typically, a small two stroke engine can provide more power in a simple design, however, such two stroke engines generally draw fuel into the crankcase as the piston rises, and require oil added to the fuel to lubricate main and rod bearings. Such two stroke engines have been banned in many applications due to emissions. As a result, there is a need for a two stroke engine which provides the advantages of a two stroke engine, without requiring oil added to the fuel.

Further, known two stroke motors compress air in the crankcase and then transfer the compressed air to the cylinder. The compression in the crankcase is limited by the change in volume between piston TDC and BDC. The air is only transferred from the crankcase to the cylinder when the piston uncovers a transfer port near BDC, and the amount of air transferred is limited by the limited compression of the air in the crankcase.

BRIEF SUMMARY OF THE INVENTION

The present invention addresses the above and other needs by providing a two-stroke engine without requiring oil added to the fuel. The two-stroke engine comprising a cylinder block with a crankshaft supported for rotation. A trunnion is fixedly attached to the engine block, at least one throttle body attached to the trunnion communicates with a trunnion interior. A cylinder head is rotatably attached to the trunnion, supporting a fuel injector and an ignition device. The engine includes a charge cylinder and a power cylinder, each housing a charge piston and a power piston respectively, both pistons connected to the crankshaft. Air intake into the charge cylinder is controlled to allow an airflow into the charge cylinder during the intake stroke, and capture air inside a charge piston chamber during the compression stroke. The captured air is transferred from the charge piston chamber into the power cylinder at Bottom Dead Center (BDC) and compressed during a power piston compression stroke. No oil is required to be mixed with the fuel enhancing engine efficiency.

In accordance with one aspect of the invention, there is provided a two-stroke engine having pairs of charge pistons in charge cylinders and power pistons in power cylinders, connected to a common crankshaft journal. The charge pistons draws air into the charge cylinder during a charge piston intake stroke, and compresses the air into a charge piston chamber on a charge piston compression stroke. When both the charge piston and power piston reach BDC at the same time the compressed air in the charge piston chamber flows into the power cylinder. The air is then further compressed with added fuel in the power cylinder and ignited near TDC for a power stroke.

In accordance with another aspect of the invention, there is provided a two-stroke engine including either check valves, or trunnion intake air ports and cylinder head intake air ports, which align and miss-align for air regulation into the charge cylinder. The alignment allows air to be drawn into the charge cylinder during a charge piston intake stroke, and the miss alignment allows the air to be compressed into the charge cylinder chamber during a charge piston compression stroke.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

The motion of the pistons is described below as inward when the pistons move towards a crankshaft away from the cylinder heads, and outward as the pistons move away from the crankshaft and towards the cylinder heads.

Figure 1A:
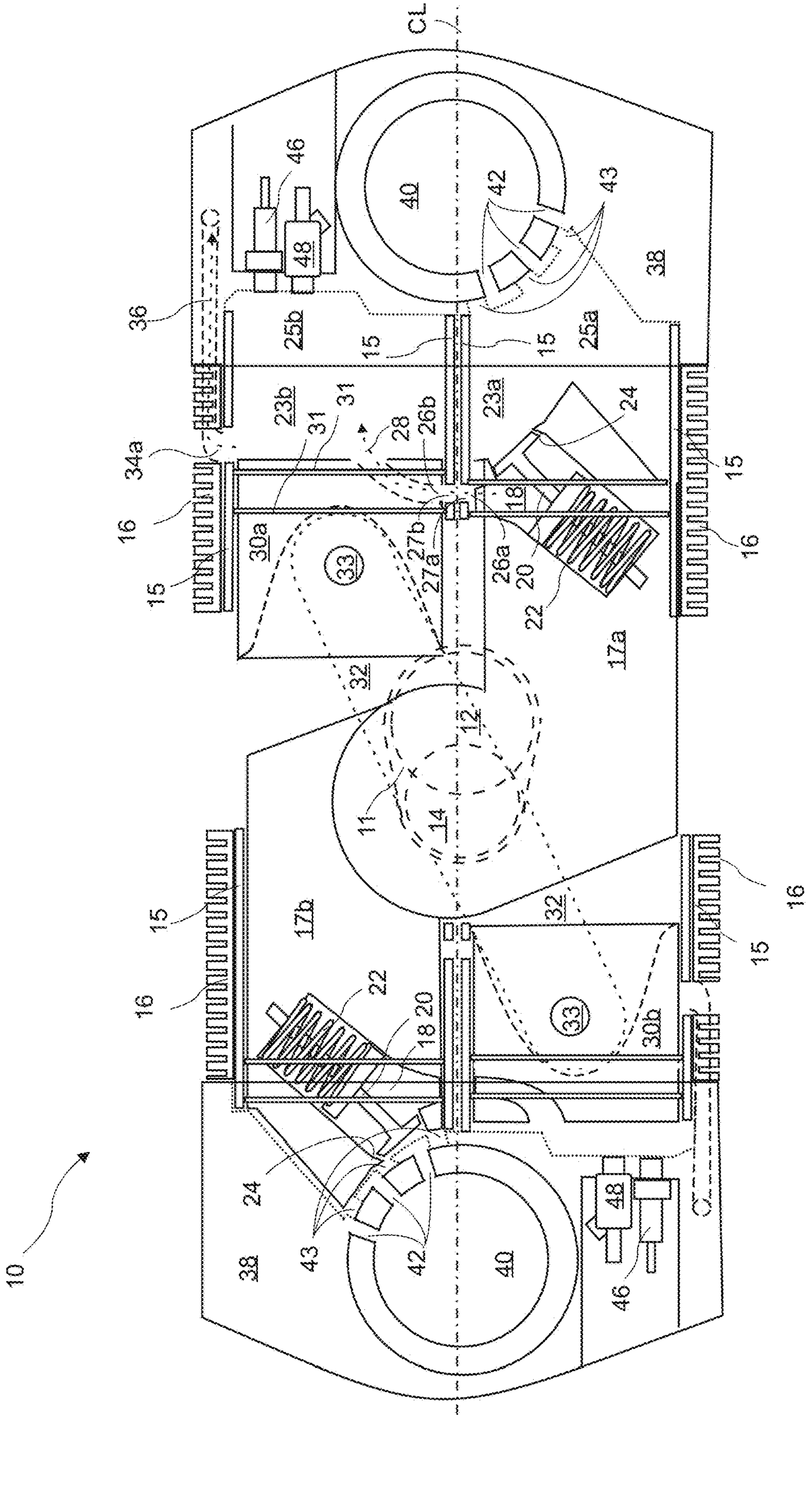
FIG. 1A shows a side view of a two stroke charge piston engine according to the present invention with a top left charge piston and a bottom left power piston both at Top Dead Center (TDC) and a top right power piston and a lower right charge piston both at Bottom Dead Center (BDC).

FIG. 1A shows a side view of two cooperating pairs of cylinders of a two stroke charge piston engine 10 according to the present invention with a top left charge piston 17*b* (see FIGS. 6A and 6B) and a bottom left power piston 30*b* (see FIGS. 5A and 5B), both at Top Dead Center (TDC) and a top right power piston 30*a* and a lower right charge piston 17*a*, both at Bottom Dead Center (BDC). The charge pistons 17*a* and 17*b* and power pistons 30*a* and 30*b* operate in charge cylinders volume 23*a* (the volume inside the cylinder sleeve 15 between the charge pistons 17*a* and 17*b* and the cylinder heads 38) and power cylinder volume 23*b* (the volume inside the cylinder sleeves 15 between the power piston 10*a* and 30*b* and the cylinder head 38) respectively. The charge pistons 17*a* and 17*b*, and the power pistons 30*a* and 30*b*, all ride on the same rod journal 14 of a crankshaft 11 having a main journal 12. Cylinder blocks 16 are fixed to the cylinder heads 38 and the cylinder sleeves 15 are fixed inside cylinder blocks 16. The crankshaft 11 rotates inside an engine block 13 (see FIG. 1B) and the trunnions 40 and 40' are fixed to the engine block 13 and do not rotate.

Those skilled in the art will recognize that the paired charge pistons and power pistons may be attached to separate crankshaft journals as long as the paired charge pistons and power pistons reach BDC at or near the same time, and engines having the paired charge pistons and power pistons on separate journals are intended to come within the scope of the present invention.

During a charge piston intake stroke, the charge pistons 17*a* and 17*b* move inward, creating a vacuum in the charge cylinders volume 23*a* drawing air into the charge cylinders volume 23*a*. During a charge cylinder compression stroke, the charge pistons 17*a* and 17*b* move outward compressing the air in the charge piston cylinders volume 23*a*, which air passes past the charge piston valves 20 and into the charge piston chambers 18 inside the charge pistons 17*a* and 17*b*.

During the charge pistons 17*a*, 17*b* intake strokes, valves 20 are closed against the valve seats 24 by the valve springs 22 retaining the compressed air in the charge piston chambers 18. At or near BDC at the end of the charge piston intake strokes, charge piston charge passages 26*a* and power piston charge passages 26*b* align with charge piston cylinder ports and power piston cylinder ports 27*a* and 27*b* in the charge cylinders volume 23*a* and power cylinders volume 23*b*, and the compressed air captured in the charge piston chambers 18 flows 28 into the power piston cylinders volume 23*b*. The air is then further compressed in the power piston cylinders volume 23*b* and into the combustion chambers 25*b* during power piston compression strokes. Fuel is injected by fuel injectors 48 into the combustion chambers 25*b* at or near TDC to mix with the compressed air for ignition by spark plugs 48 in a direct injection engine 10. Alternatively, the fuel may be added to the air drawn into the charge cylinders volume 23*a* in a non-direct injection engine, through fuel injection into a throttle body 50 (see FIG. 1B) or by carburetors.

The compressed air-fuel mixture in the combustion chambers 25*b* is ignited by the spark plugs 46 within the combustion chambers 25*b*, expanding gases drive the power pistons 30*a* and 30*b* towards the crankshaft 11. The power piston motion generates mechanical power, which is transferred via the power piston rods 32 to the crankshaft 11, converting the linear motion of the power pistons 30*a* and 30*b* into rotational energy of the crankshaft 11.

Once the power pistons 30*a* and 30*b* have completed a power stroke and are at or near BDC, the spent gases are expelled from the power cylinder volume 23*b* through the exhaust ports 34*a*. The exhaust ports 34*a* are preferably opposite to the charge piston cylinder ports 27*a* and air 28 rushing into the power cylinder volume 23*b* through the charge piston cylinder ports 27*a* further urges the exhaust flow 36 to exit the power cylinder volume 23*b* through the exhaust ports 34*a*. The exhaust system includes exhaust flow passages 34*b* in cylinder heads 38 and into the trunnions 40 providing fixed exhaust ports 37 (see FIG. 1B) in the trunnions 40.

Figure 2:
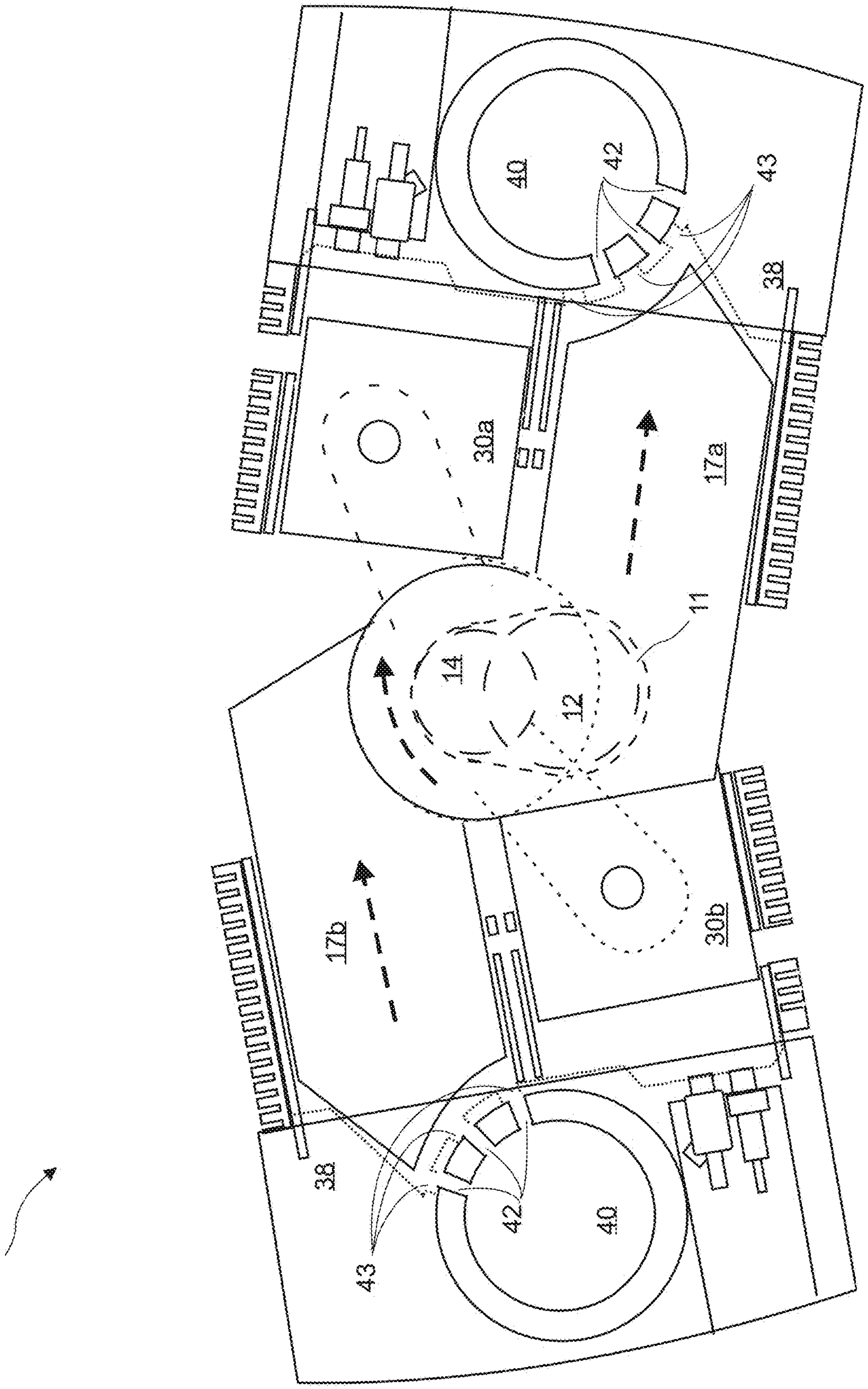
FIG. 2 shows a side view of the two stroke charge piston engine according to the present invention with a crankshaft rotated 90 degrees clockwise from FIG. 1 and the bottom right charge piston in a compression stroke and the top left charge piston in an intake stroke.
Figure 4:
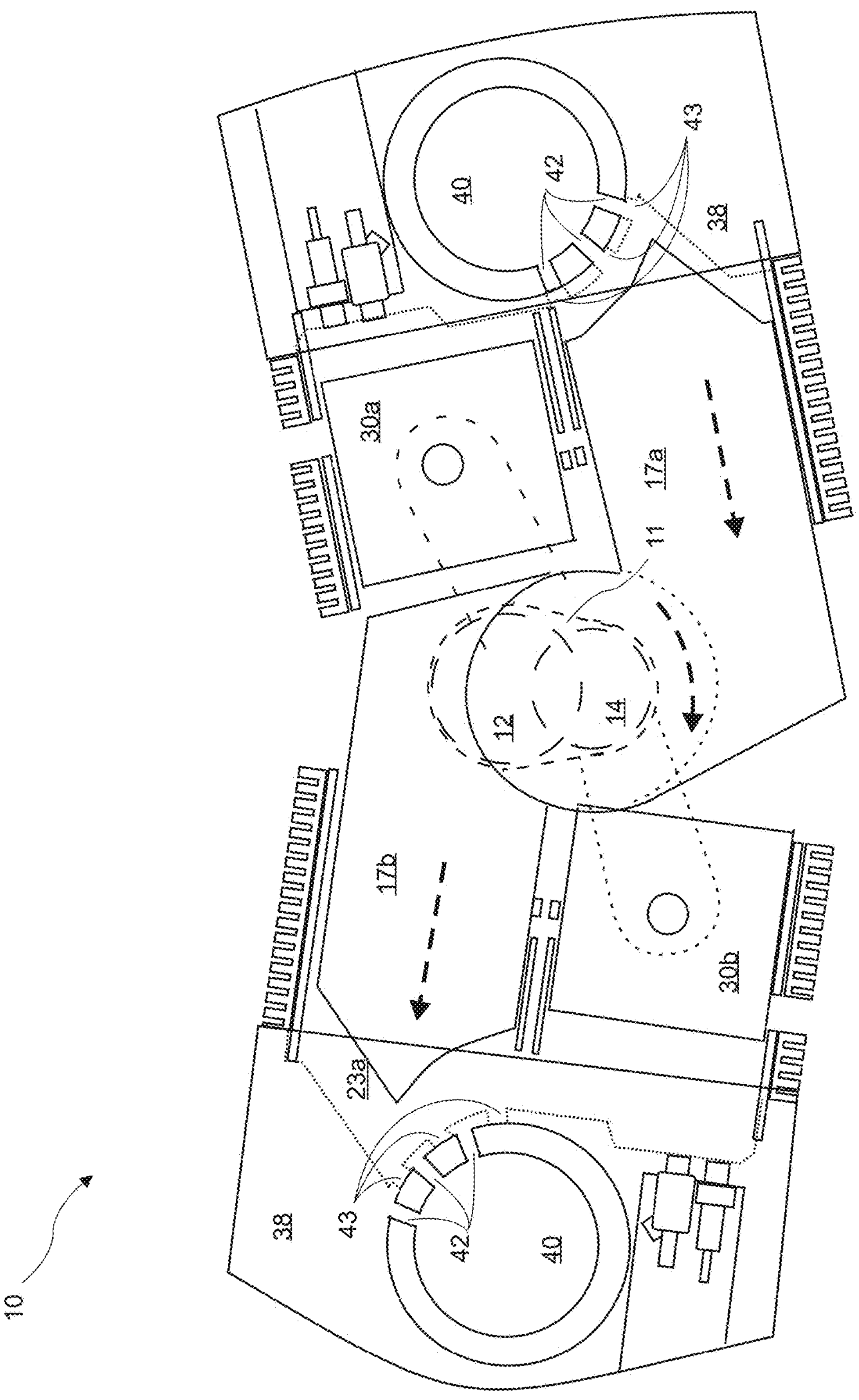
FIG. 4 shows a side view of the two stroke charge piston engine according to the present invention with a crankshaft rotated 270 degrees clockwise from FIG. 1 and the bottom right charge piston in an intake stroke and the top left charge piston in a compression stroke.

Cylinder heads 38 pivot on the fixed trunnions 40 and carry the pivoting cylinder blocks 16 allowing the cylinder blocks 16 carrying the sleeves 15 to pivot on the trunnions 40 as the pistons 17*a*, 17*b*, 30*a* and 30*b* reciprocate in the cylinders volume 23*a* and volume 23*b*, as shown in FIGS. 2 and 4. The charge piston 17*a* and 17*b* connect to the rod journal 14 without a connecting rod, and the pivot of the cylinder blocks 16 is determined by the geometry of the rod journal 14, the charge pistons 17*a* and 17*b*, and the trunnions 40. The pivoting of the blocks 16 on the fixed trunnions 40 maintains alignment of the pistons 17*a*, 17*b* with the cylinders volume 23*a*. The power pistons 30*a* and 30*b* ride on piston pins 33 and align with the cylinders volume 23*b*.

The heads 38 form the tops of the charge chambers 25*a* and combustion chambers 25*b* and house elements, for example, the spark plugs 46 and fuel injectors 48. Head ports 43 allow for the intake of fresh air into the charge cylinders volume 23*a* and the exhaust ports 34 allows expulsion of exhaust gas flows 36 from the engine 10.

Piston rings 31 reside around the charge pistons 17*a* and 17*b* and power pistons 30*a* and 30*b* above and below the charge passages 26*a* and 26*b*, creating a seal between the pistons 17*a*, 17*b*, 30*a*, and 30*b* and the cylinder sleeves 15 fixed, reducing or prevent the leakage of compressed air during piston strokes and when the compressed air is transferred from the charge piston chambers 18 into the power cylinders volume 23*b*.

Trunnion ports 42 and head ports 43 are miss-aligned at TDC and BDC and are only aligned during a charge piston intake stroke.

While the engine 10 is described above with pivoting cylinders, those skilled in the art will recognize that a two stroke charge piston engine may also have fixed cylinders and connecting rods connecting both the charge piston and the power piston to the crankshaft, and any two stroke engine having a charge piston including a chamber capturing compressed air during a charge piston compression stroke, and transferring the compressed air to a power piston at BDC, is intended to come within the scope of the present invention.

Figure 1B:
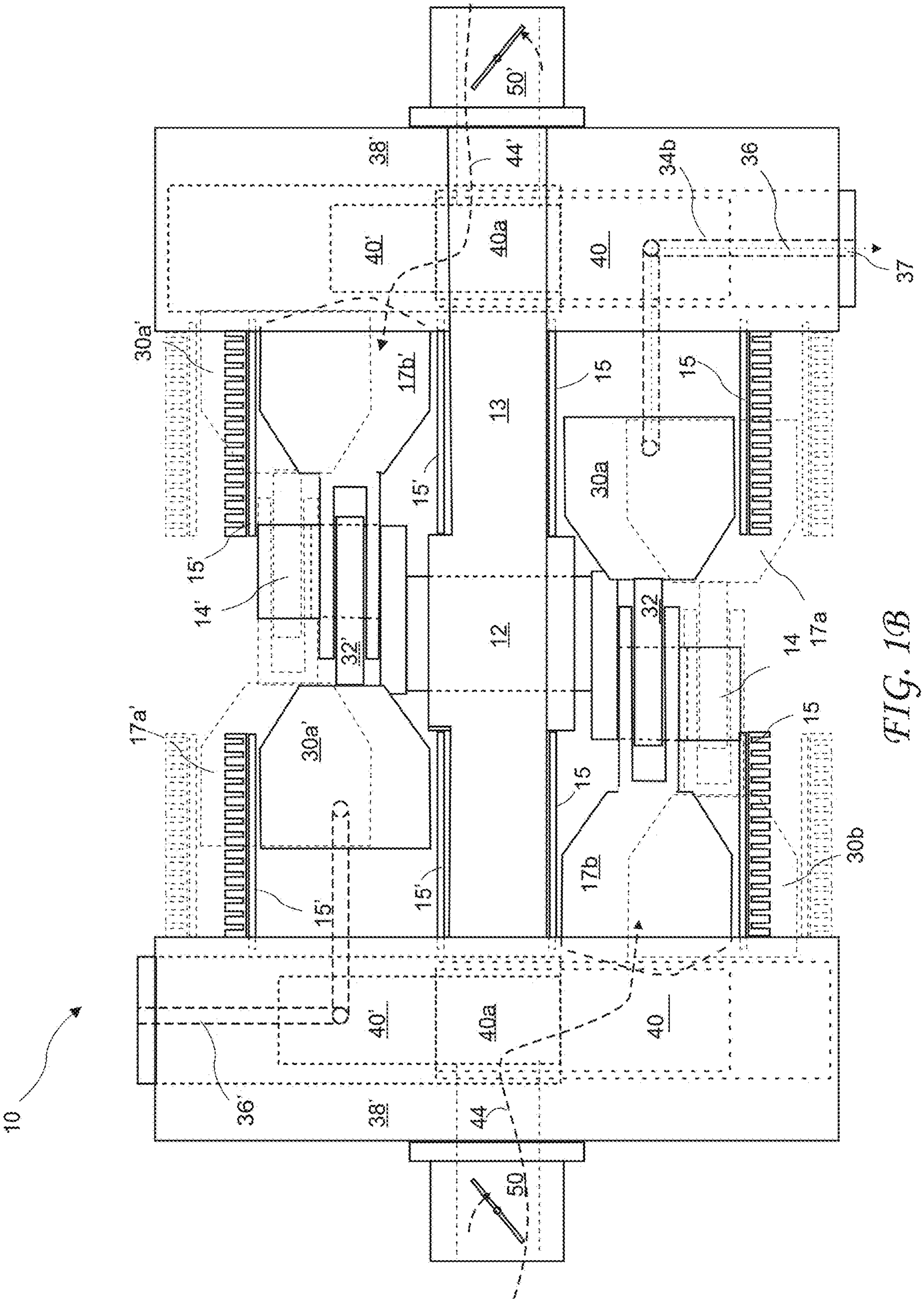
FIG. 1B shows a top view of a four cylinder embodiment of the two stroke charge piston engine according to the present invention.

FIG. 1B illustrates a detailed top view of a four pairs of pistons version of the engine 10, showing the mechanical arrangement and interaction of the charge pistons 17*a*, 17*b*, 17*a*' and 17*b*', and power piston 30*a*, 30*b*, and 30*a*' and 30*b*' and related components. The trunnions 40 may be two pieces, 40 and 40'. The pistons 17*a*', 17*b*', 30*a*' and 30*b*' all riding on a second rod journal 14' of the crankshaft 11 not shown in FIG. 1A, and the main journal 12 rotated in the engine block 13. Intake air flows 44 and 44' enter trunnion interiors 40*a* of the trunnions 40 and 40' of the engine 10 through the throttle bodies 50 and 50', and enter the charge cylinders volume 23*a* through trunnion ports 42 when aligned with head ports 43 (see FIG. 1A). The elements in FIG. 1B not shown in FIG. 1A are indicated by an apostrophe added to the element number in FIG. 1A.

Figure 3:
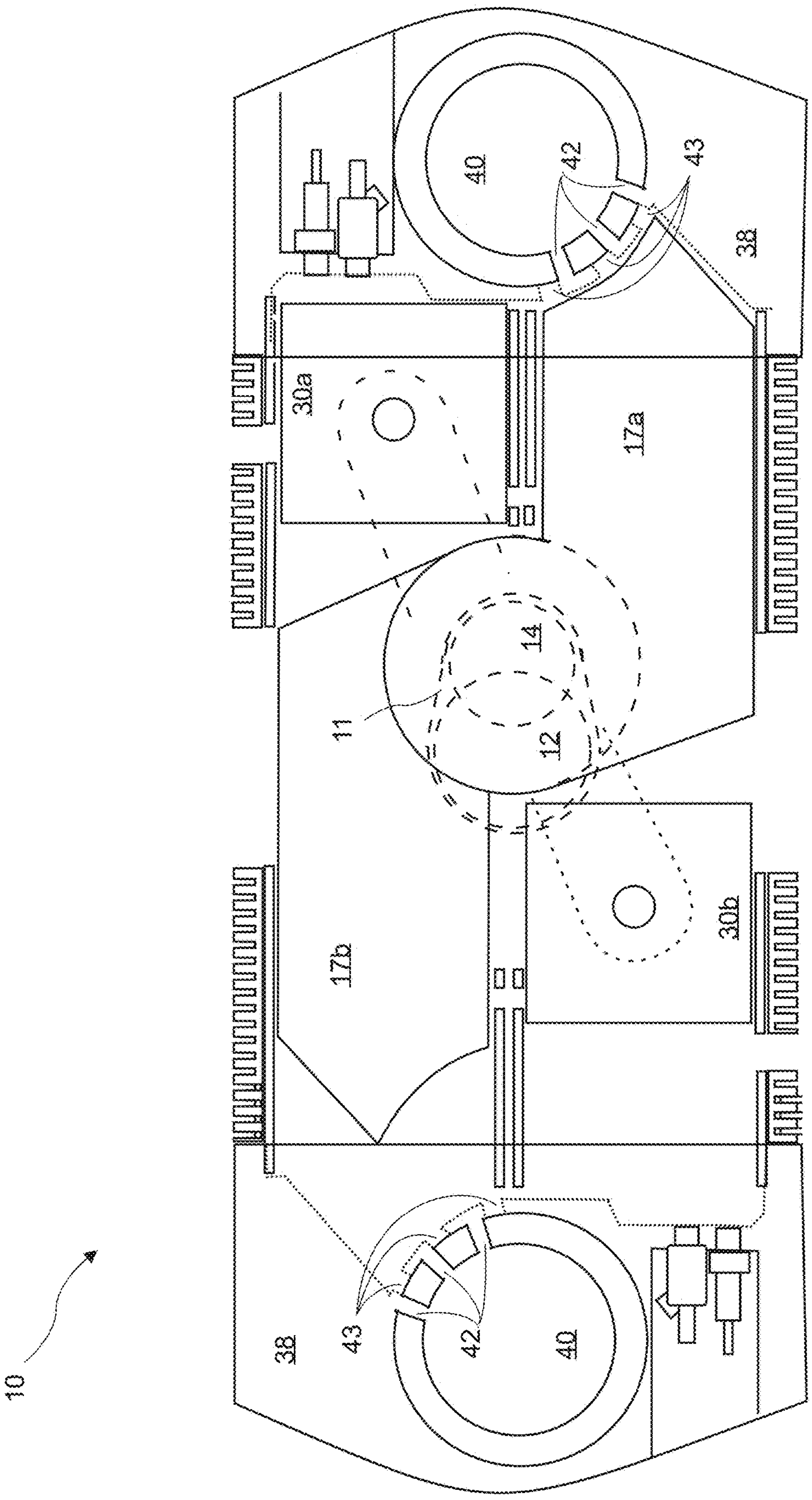
FIG. 3 shows a side view of the two stroke charge piston engine according to the present invention with the top left charge piston and the bottom left power piston both at BDC and the top right power piston and the lower right charge piston both at TDC.

FIGS. 2 to 4 illustrate different operational phases of the two-stroke charge piston engine 10, highlighting the positions of the charge pistons 17*a* and 17*b* and power pistons 30*a* and 30*b* as the crankshaft 11 rotates. In FIG. 2, with the crankshaft rotated 90 degrees clockwise from FIG. 1, the bottom right charge piston 17*a* is in a compression stroke, moving outward to compress the air in the charge cylinder volume 23*a*, while the top left charge piston 17*b* is in the intake stroke, moving inward to draw fresh air into the charge cylinder volume 23*a*. The ports 42 and 43 are miss-aligned in the lower right charge cylinder volume 23*a* to allow the air in the lower right charge cylinder volume 23*a* to be compressed, and the ports 42 and 43 are aligned in the top left charge cylinder to allow the air to be drawn into the top left charge cylinder volume 23*a*.

FIG. 3 shows the engine with the top left charge piston 17*b* and bottom left power piston 30*b* both at BDC, the charge piston 17*b* having completed a intake stroke and the power piston 30*b* having completed a power stroke. The top right power piston 30*a* and lower right charge piston 17*a* are at TDC, the power piston 30*s* having completes a power piston compression stroke and the charge piston 17*a* having completed a charge piston compression stroke.

FIG. 4 shows the crankshaft 11 rotated 270 degrees clockwise from FIG. 1. The bottom right charge piston 17*a* is in a charge intake stroke, moving inward, while the top left charge piston 17*b* is in a compression stroke, moving outward to compress air in the charge cylinder volume 23*a*. The top right power piston 30*a* is in a power stroke and the bottom left power piston 30*b* is in a compression stroke. These figures show the synchronized movement of the pistons. The trunnion ports 42 and the head ports 43 are only aligned for the charge piston intake stroke and misaligned are all other times.

Figure 5A:
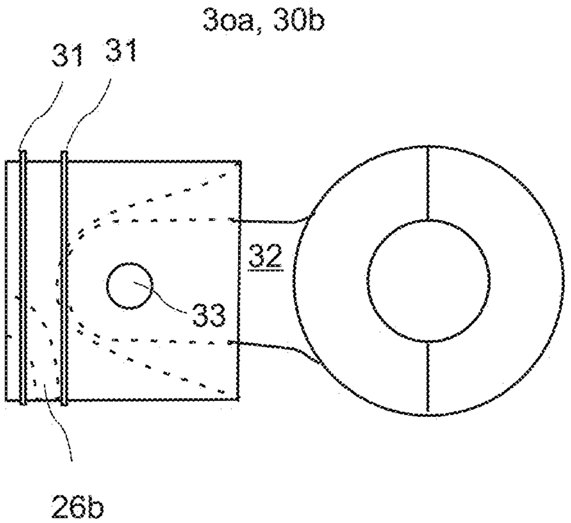
FIG. 5A shows a side view of the power piston and a connecting rod of the two stroke charge piston engine according to the present invention.
Figure 5B:
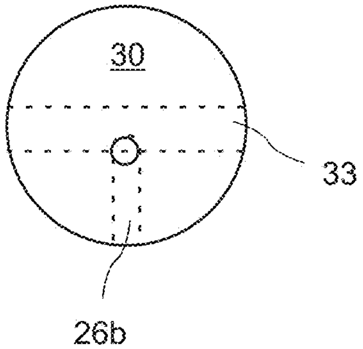
FIG. 5B shows a top view of the power piston and the connecting rod of the two stroke charge piston engine according to the present invention.

FIG. 5A shows a side view of the power piston 30*a* and 30*b*, connected to the connecting rod 32 by piston pin 33 and FIG. 5B shows a top view of the power pistons 30*a* and 30*b* . . . . The piston rings 31 reside above and below the power piston charge passage 31 create a tight seal with the cylinder sleeves 15, preventing pressure loss during the compression and combustion strokes. The power piston charge passage 26*b* is also illustrated, located between the perimeter of the power piston 30 and its top surface. This passage allows for the communication of air from the charge piston chamber 18 into the combustion chamber 25*b*.

Figure 6A:
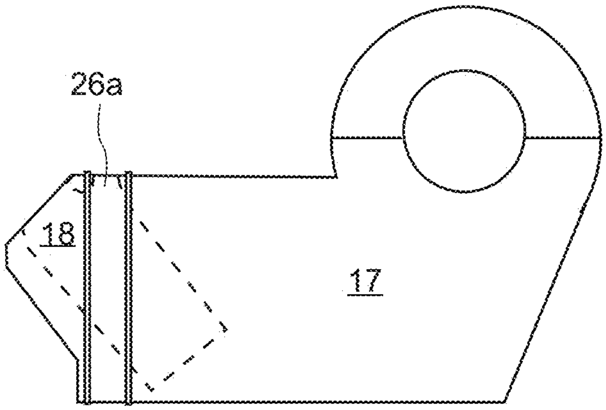
FIG. 6A shows a side view of the charge piston of the two stroke charge piston engine according to the present invention.
Figure 6B:
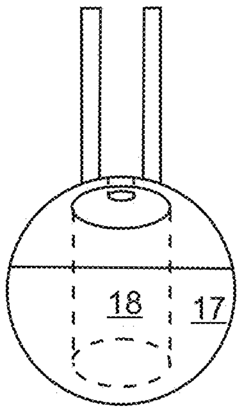
FIG. 6B shows a top view of the charge piston of the two stroke charge piston engine according to the present invention.

FIG. 6A shows a side view of the charge piston 17*a* and 17*b* and FIG. 6B shows a top view of the charge piston 17*a* and 17*b*. The charge piston charge passage 26*a* connects the charge piston chamber 18 to the exterior of the charge piston 17*a* and 17*b*.

Figure 7A:
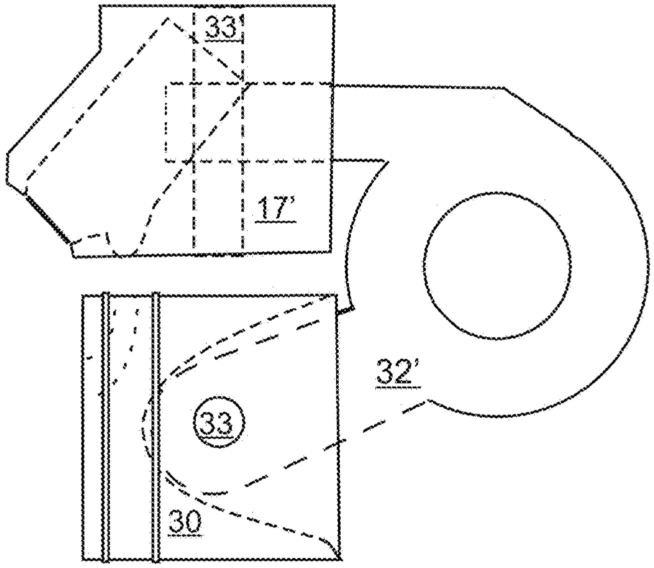
FIG. 7A shows a side view of one piece charge piston and power piston connecting rod of the two stroke charge piston engine according to the present invention.
Figure 7B:
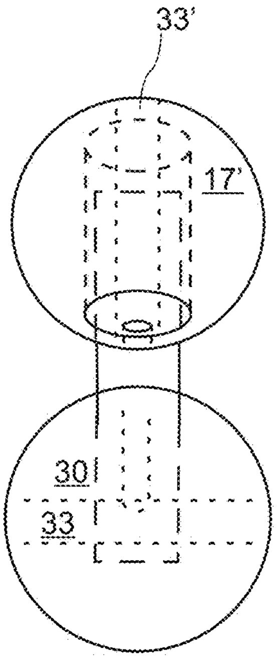
FIG. 7B shows a top view of one piece charge piston and power piston connecting rod of the two stroke charge piston engine according to the present invention.

FIG. 7A and FIG. 7B an alternative embodiment of the pistons and rod. A one-piece connecting rod assembly 32' couples the charge piston 17' and the power piston 30 to the crankshaft 11. In FIG. 7A, the side view shows how the charge piston 17' is positioned above the power piston 30, both connected by the one-piece connecting rod 32', which couples linear motion of the pistons 17' and 30 with rotational motion of the crankshaft 11. The piston pin 33' secures the charge piston 17' to the upper section of the connecting rod, while the piston pin 33 connects the power piston 30 to the lower part. This design allows both pistons to move in unison, facilitating efficient transitions between the intake, compression, combustion, and exhaust strokes. In FIG. 7B, the top-down view highlights the alignment of the pistons along the connecting rod 32', with the piston pins 33, 33' connecting the pistons to the rod. The operation of engine having the pistons and rods in FIGS. 7A and 7B is otherwise similar to the operation of the engine 10.

Figure 8:
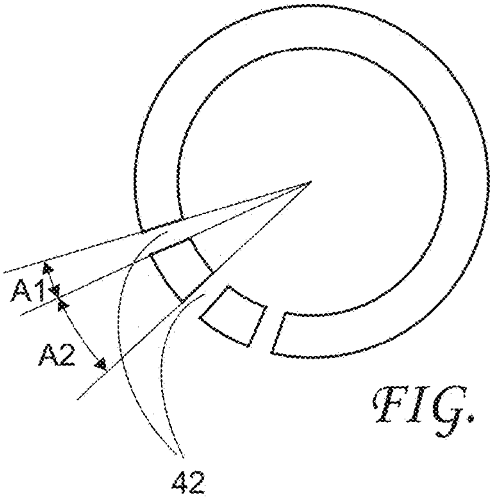
FIG. 8 shows trunnion intake air ports of the two stroke charge piston engine according to the present invention.
Figure 9:
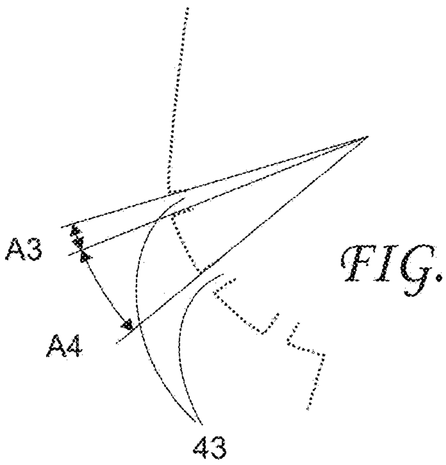
FIG. 9 shows cylinder head intake air ports of the two stroke charge piston engine according to the present invention.

FIGS. 8 and 9 show the cooperation of the ports 42 and 43. The widths A1 and A3 of the ports 42 and 43 and the separation A2 and A4 of the of the ports 42 and 43 is determined based on the amount of the pivot of the cylinder blocks 16 to only align the ports 42 and 43 during the charge piston intake stroke, and misalign the ports at all other times, with an exception that in some operation the alignment may be extended to capture some addition air after BDC of the charge piston intake stroke when momentum of the intake air flow 44 may add additional air into the charge piston cylinder volume 23*a* after the charge piston 17 or 17*b* passes BDC.

Figure 10A:
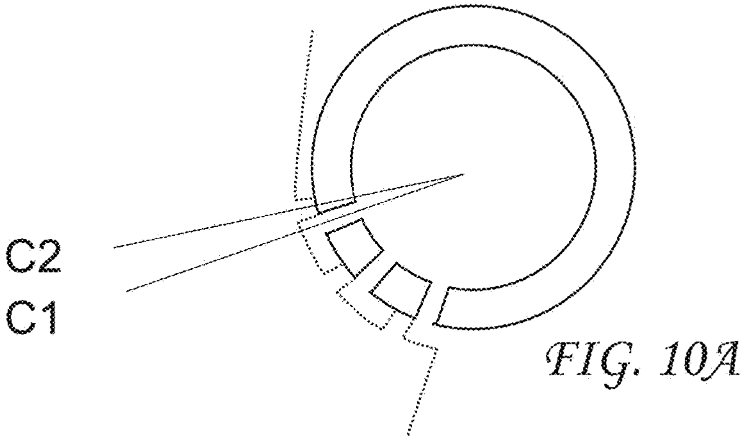
FIG. 10A shows the miss-alignment of the trunnion intake air ports and the cylinder head intake air ports of the two stroke charge piston engine according to the present invention when the corresponding charge piston is at BDC.

FIGS. 10A-10D illustrate the misalignment and alignment of the trunnion ports 42 and the head ports 43 during different strokes of the two-stroke charge piston engine 10 operation. FIG. 10A shows the ports misaligned when the charge piston 17*a* or 17*b* is at BDC, to capture the air in the charge piston cylinder volume 23*a* during the following compression stroke.

Figure 10B:
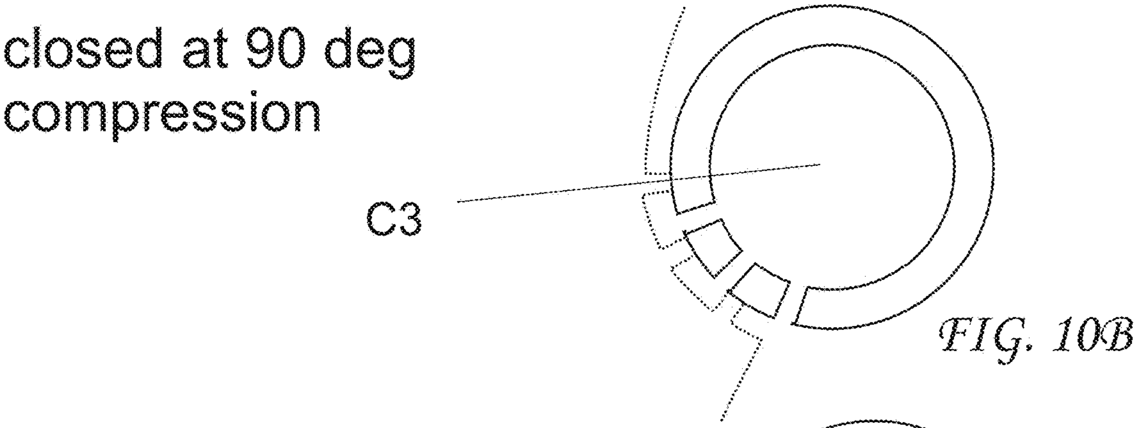
FIG. 10B shows the miss-alignment of the trunnion intake air ports and the cylinder head intake air ports of the two stroke charge piston engine according to the present invention when the charge piston is in the charge piston compression stroke.

FIG. 10B shows the misalignment of the trunnion ports 42 and the head ports 43 during the charge piston compression stroke, as the charge piston 17 moves outward, preventing air from escaping, and allowing full compression of the air in the charge piston cylinder volume 23*a*.

Figure 10C:
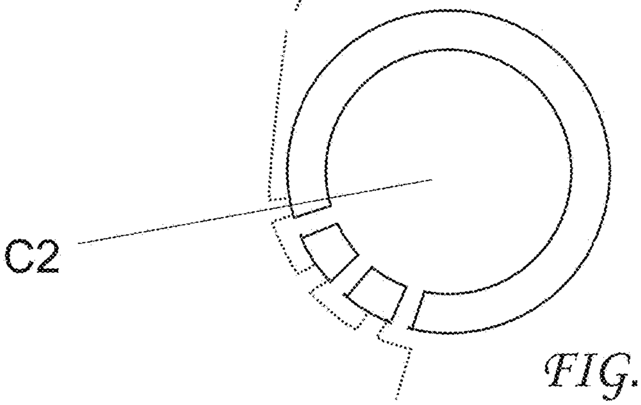
FIG. 10C shows the miss-alignment of the trunnion intake air ports and the cylinder head intake air ports of the two stroke charge piston engine according to the present invention when the corresponding charge piston is at TDC.

FIG. 10C shows the trunnion ports 42 and the head ports 43 misalignment when the charge pistons 17*a* and 17*b* reaches TDC, to complete the compression of the air captured into the charge piston chamber 18 of the charge pistons 17*a* and 17*b* and in the power piston cylinder volume 23*b* prior to ignition.

Figure 10D:
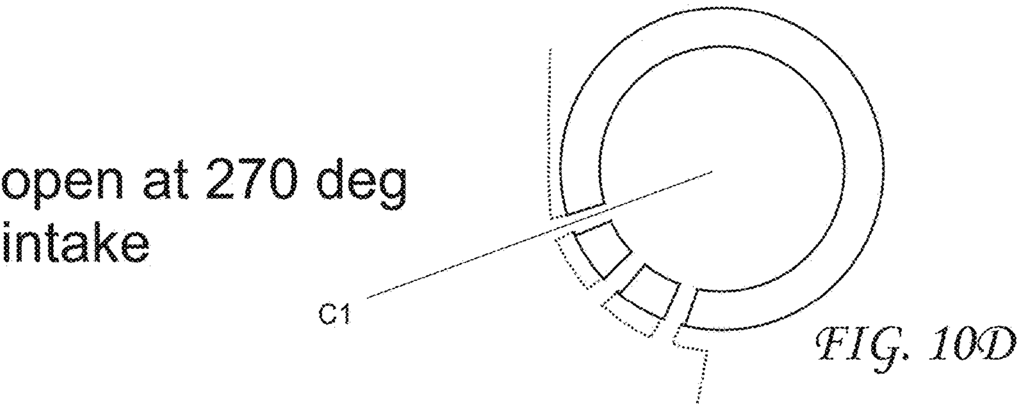
FIG. 10D shows the alignment of the trunnion intake air ports and the cylinder head intake air ports of the two stroke charge piston engine according to the present invention when the charge piston is in the intake stroke.

FIG. 10D illustrates the alignment of the trunnion ports 42 and the head ports 43 during the intake stroke, where the charge pistons 17*a* and 17*b* are moving outward drawing air into the charge piston cylinder volume 23*a*. These figures underscore the importance of controlling port alignment and misalignment to manage intake, compression, and airflow efficiently during each phase of the two-stroke cycle.

Figure 11:
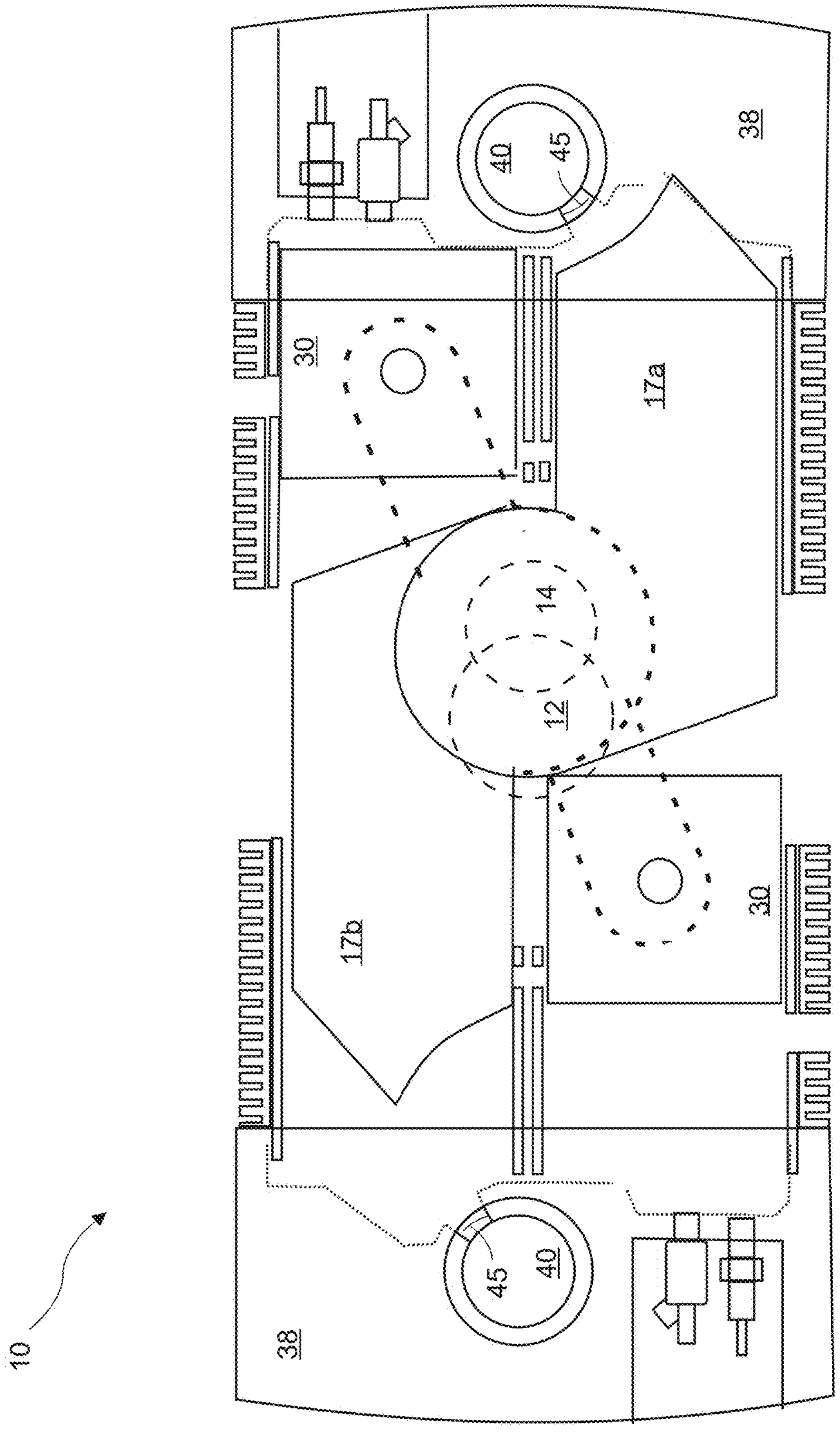
FIG. 11 shows a side view of the two stroke charge piston engine according to the present invention having check valves in the air flow through the trunnion intake air ports and the cylinder head intake air ports.

FIG. 11 provides a side view an alternative two-stroke charge piston engine 10 according to the present invention, focusing on the incorporation of check valves 45 in the trunnion or in the head, replacing the trunnion intake air ports 42 and the cylinder head intake air ports 43. The check valves 45 ensure that air flows into the engine during the intake stroke while preventing any backflow of air out of the charge piston cylinder during the charge piston compression stroke.

While the invention herein disclosed has been described by means of specific embodiments and applications thereof, numerous modifications and variations could be made thereto by those skilled in the art without departing from the scope of the invention set forth in the claims.

I claim:

1. A two stroke engine comprising: an engine block; a crankshaft supported to rotate in the engine block; a cylinder head attached to the engine block; a charge piston cylinder attached to the cylinder head; a power piston cylinder attached to the cylinder head; a charge piston connected to the crankshaft and residing in the charge piston cylinder; a charge piston volume in the charge piston cylinder between the charge piston and the cylinder head; a power piston paired with the charge piston and connected to the crankshaft and residing in the power piston cylinder; the charge piston and the power piston reaching Bottom Dead Center (BDC) at the same time; a power piston volume in the power piston cylinder between the power piston and the cylinder head; a throttle body in fluid communication with the charge piston volume through the cylinder head; cylinder head valving between the throttle body and the charge piston volume, the valving configured to allow air to flow from the throttle body into the charge piston volume during a charge piston intake stroke and restrict air from flowing from the charge piston volume into the throttle body during a charge piston compression stroke; a chamber inside the charge piston in fluid communication with the charge piston volume; chamber valving between the chamber and the charge piston volume, the chamber valving configured to allow air to flow from the charge piston volume into the chamber and restrict air from flowing from the chamber into the charge piston volume; a charge piston charge passage in the charge piston; a charge piston cylinder port in the charge piston cylinder; a power piston charge passage in the power piston; a power piston cylinder port in the power piston cylinder; the chamber in fluid communication with the power piston volume through the charge piston charge passage, the charge piston cylinder port, the power piston charge passage and the power piston cylinder port when the charge piston and the power piston are at BDC; and an ignition device attached to the cylinder head to ignite fuel in the two stroke engine.

2. The engine of claim 1, further including: the power piston charge passage in the power piston providing fluid communication between the power piston cylinder port and the power piston volume; and piston rings around the power piston, configured to maintain a seal between the power piston and the power cylinder during compression and combustion phases.

3. The engine of claim 1, further including:

a trunnion fixedly attached to the cylinder block;

a trunnion intake air port through the trunnion;

the cylinder heads pivot on the trunnion;

a cylinder head intake air port through the cylinder head; and the cylinder head valving comprising rotation of the cylinder heads on the trunnion aligning the trunnion intake port with the cylinder head intake port to allow air to flow through the trunnion into the charge cylinder during a charge piston intake stroke and rotation of the cylinder heads on the trunnion miss-aligning the trunnion intake port with the cylinder head intake port to restrict the air from flowing from the charge cylinder into the trunnion during a charge piston compression stroke.

4. The engine of claim 1, wherein the cylinder head valving comprises a check valve between the throttle body and the charge piston cylinder allowing air to flow from the throttle body into the charge piston cylinder during the charge piston intake stroke and restricting or preventing air from flowing from the charge piston cylinder to the throttle body during the charge piston compression stroke.

5. The engine of claim 4, wherein the check valve configured to open at a specified pressure, allowing air into the chamber inside the charge piston only during the charge piston compression stroke.

6. The engine of claim 1, wherein the chamber valving comprises a check valve allowing air to enter the charge piston cylinder but not escape from the charge piston cylinder.

7. The engine of claim 1, further including a fuel injector attached to the cylinder head to provide fuel to the two stroke engine.

8. A two stroke engine comprising: a cylinder block; a crankshaft supported to rotate in the cylinder block; a trunnion fixedly attached to the cylinder block to not rotate; a cylinder head pivotally attached to the trunnion; a charge piston cylinder attached to the cylinder head; a power piston cylinder attached to the cylinder head; a charge piston connected to a crankshaft journal of the crankshaft and residing in the charge piston cylinder; a charge piston volume between the charge piston and the cylinder head; a power piston connected to the crankshaft journal of the crankshaft and residing in the power piston cylinder; a power piston volume between the power piston and the cylinder head; a trunnion interior of the trunnion; a throttle body in fluid communication with the trunnion interior; cylinder head valving allowing air to flow through the trunnion into the charge cylinder during a charge piston intake stroke and restricting the air from flowing from the charge cylinder into the trunnion during a charge piston compression stroke; a chamber inside the charge piston in fluid communication with the charge piston volume; chamber valving between the chamber and the charge piston volume, the chamber valving configured to allow air to flow from the charge piston volume into the chamber and restrict air from flowing from the chamber into the charge piston volume; a charge piston charge passage in the charge piston; a charge piston cylinder port in the charge piston cylinder; a power piston charge passage in the power piston; a power piston cylinder port in the power piston cylinder; the chamber in fluid communication with the power piston volume through the charge piston charge passage, the charge piston cylinder port, the power piston charge passage and the power piston cylinder port when the charge piston and the power piston are at BDC; an ignition device attached to the cylinder head to ignite fuel and air in the power piston cylinder; a sealing system between the cylinder head and the trunnion comprising: primary seals positioned around the first set of ports; secondary seals positioned around the second set of ports; the seals maintain compression during the engine cycle.

9. The engine of claim 8, wherein the cylinder head valving comprises rotation of the cylinder heads on the trunnion aligning the trunnion intake port with the cylinder head intake port to allow air to flow through the trunnion into the charge cylinder during a charge piston intake stroke and rotation of the cylinder heads on the trunnion miss-aligning the trunnion intake port with the cylinder head intake port to restrict the air from flowing from the charge cylinder into the trunnion during a charge piston compression stroke.

10. The engine of claim 8, wherein the cylinder head valving comprises a check valve allowing air to flow through the trunnion into the charge cylinder during a charge piston intake stroke and restricting the air from flowing from the charge cylinder into the trunnion during a charge piston compression stroke.

11. A two stroke engine comprising: a cylinder block; a crankshaft supported to rotate in the cylinder block; a trunnion fixedly attached to the cylinder block to not rotate; a cylinder head rotatedly attached to the trunnion; a charge piston cylinder attached to the cylinder head; a power piston cylinder attached to the cylinder head; a charge piston connected to the crankshaft and residing in the charge piston cylinder; a charge piston volume between the charge piston and the cylinder head; a power piston connected to the crankshaft and residing in the power piston cylinder; a power piston volume between the power piston and the cylinder head; a trunnion interior of the trunnion; a throttle body in fluid communication with the trunnion interior; cylinder head valving comprising rotation of the cylinder heads on the trunnion aligning the trunnion intake port with the cylinder head intake port to allow air to flow through the trunnion into the charge cylinder during a charge piston intake stroke and rotation of the cylinder heads on the trunnion miss-aligning the trunnion intake port with the cylinder head intake port to restrict the air from flowing from the charge cylinder into the trunnion during a charge piston compression stroke; a chamber inside the charge piston in fluid communication with the charge piston volume; chamber valving between the chamber and the charge piston volume, the chamber valving configured to allow air to flow from the charge piston volume into the chamber and restrict air from flowing from the chamber into the charge piston volume; a charge piston charge passage in the charge piston; a charge piston cylinder port in the charge piston cylinder; a power piston charge passage in the power piston; a power piston cylinder port in the power piston cylinder; the chamber in fluid communication with the power piston volume through the charge piston charge passage, the charge piston cylinder port, the power piston charge passage and the power piston cylinder port when the charge piston and the power piston are at BDC; an ignition device attached to the cylinder head to ignite fuel and air in the power piston cylinder.

* * * * *